United States Patent [19]

Peitsmeier et al.

[11] Patent Number: 5,269,562
[45] Date of Patent: Dec. 14, 1993

[54] AXIALLY ADJUSTABLE STEERING COLUMN FOR VEHICLES

[75] Inventors: Karl Peitsmeier, Aldingen; Herbert Täuber, Stuttgart; Jürgen Teichmann, Aspach; Wolfgang Schuliers, Weinstadt, all of Fed. Rep. of Germany

[73] Assignee: Mercedes-Benz AG, Fed. Rep. of Germany

[21] Appl. No.: 829,498

[22] Filed: Feb. 3, 1992

[30] Foreign Application Priority Data

Feb. 6, 1991 [DE] Fed. Rep. of Germany ........ 4103548

[51] Int. Cl.$^5$ ............................................... B62D 1/18
[52] U.S. Cl. ........................................ 280/775; 74/493
[58] Field of Search .................. 280/775, 777; 74/493

[56] References Cited

U.S. PATENT DOCUMENTS

| | | | |
|---|---|---|---|
| 4,796,481 | 1/1989 | Nolte | 280/775 X |
| 5,009,120 | 4/1991 | Iseler et al. | 280/775 X |

FOREIGN PATENT DOCUMENTS

| | | |
|---|---|---|
| 1555465 | 11/1969 | Fed. Rep. of Germany . |
| 2610139 | 9/1977 | Fed. Rep. of Germany . |
| 3409988 | 9/1985 | Fed. Rep. of Germany . |
| 3808271 | 10/1989 | Fed. Rep. of Germany . |

Primary Examiner—Joseph D. Pape
Attorney, Agent, or Firm—Evenson, McKeown, Edwards & Lenahan

[57] ABSTRACT

An axially adjustable steering column for vehicles is disclosed which has an axially displaceable steering shaft which is surrounded by two steering column jacket parts which can be pushed together in a telescopic fashion. The jacket parts can be attached to one another by way of a clamp connection. The jacket parts are axially movable with respect to one another when the clamp connection is loosened with the displacement of the steering shaft. The clamp connection has at least one threaded pin which is radially movable with respect to the longitudinal axis of the steering column jacket parts and is received on the outer steering column jacket part in a threaded section and after its screwing-in movement presses against the internal steering column jacket part. A spring-loaded control cable is provided which acts in a rotating fashion on the threaded pin. For this purpose, the control cable surrounds a pin connecting part on the threaded pin, resting against a circular cross-section at least over a distance of one arcuate section.

12 Claims, 2 Drawing Sheets

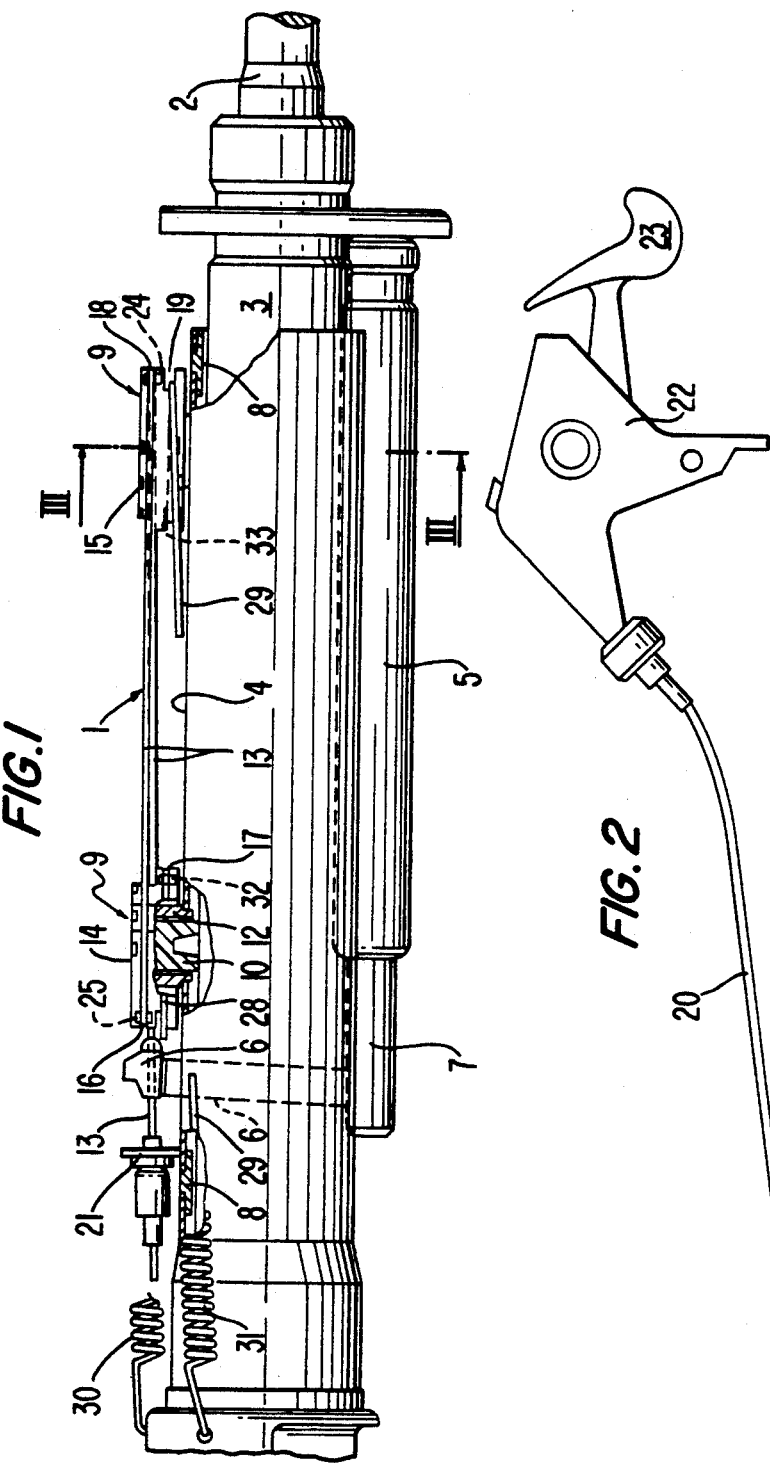
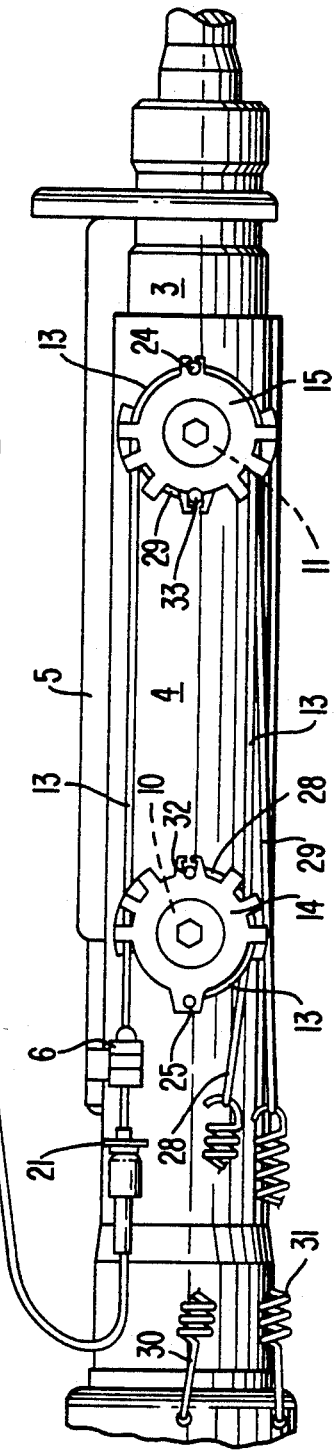
FIG.1
FIG.2

AXIALLY ADJUSTABLE STEERING COLUMN FOR VEHICLES

BACKGROUND AND SUMMARY OF THE INVENTION

The invention relates to an axially adjustable steering column for vehicles with telescoping jacket parts.

German Patent Document DE-PS 26 10 139 discloses an axially adjustable steering column for vehicles in which the steering column jacket components which can be adjusted in a telescopic fashion with respect to one another can be attached to one another by means of a clamp connection. The clamp connection has a threaded pin which can be moved radially with respect to the longitudinal axis of the steering column jacket components, is mounted on the outer steering column jacket component in a threaded section and can be attached in a non-positively engaging manner to the internal steering column jacket component by means of its rotation. The rotation of the threaded pin occurs by means of a manual wheel mounted on it.

When the threaded pin is actuated manually, a person adjusting the axial position of the steering column by turning the threaded pin is not given any information as to how far he has to turn the manual wheel until the threaded pin is loosened far enough or tightened tightly enough. Therefore after the displaceable steering column jacket component is locked there remains the unpleasant sensation of not knowing whether the locking will perhaps soon be released again automatically for example due to vibrations. This is possible in particular if the threaded pin is not impeded from coming loose, by the effect of a further force, in its screwed-in position which applies a pressure force.

German Patent Document DOS 34 09 988 shows an axially adjustable steering column with two tubes whose movement relative to one another can be prevented by means of a manually actuable lock. On unlocking, a manual lever acts here by means of a control cable on a wedge body which thus moves a locking tooth out of its corresponding toothing. A spring pulls the wedge body automatically back into its locking position, which body otherwise is not supported in its locking position which acts counter to its displacement into the unlocked position.

An object of the invention is to provide an arrangement accommodating simple releasing and securing of a clamp connection for the telescoping jacket parts of an axially adjustable steering column.

This object is achieved in preferred embodiments of the invention by providing an axially adjustable steering column system for vehicles comprising:
an axially displaceable steering shaft,
an outer and an inner steering column jacket part surrounding the steering shaft, said steering column jacket parts being configured to be pushed together in a telescopic fashion with axial movement with respect to one another, and
a clamp connection for selectively clampingly attaching the two steering column jacket parts to one another to hold them in their adjusted axial position,
wherein the clamp connection includes at least one threaded pin which is radially movable with respect to a longitudinal axis of the steering column and is received on the outer steering column jacket part in a threaded section and after its screwing-in movement presses against the inner steering column jacket part, wherein a spring-loaded control cable is provided which acts in a rotating fashion on the threaded pin, and wherein the control cable surrounds a pin connecting part on the threaded pin resting against a circular cross-section at least over a distance of one arcuate section of the threaded pin.

With a control cable which acts in a turning fashion on a threaded pin which thus attaches two steering column jacket components to one another in a non-positively engaging manner, it is possible to continue to act in a fixing manner on the threaded pin in its release position and in its locking position. The actuation of the threaded pin can then be performed from a site which is remote from the clamping device.

So that a pin connecting component can be correctly positioned on the threaded pin, which pin connecting component connects the control cable to the threaded pin is tensioned rapidly in its correct position in which the control cable is at least partially wound around the pin connecting component and the control cable is tensioned, the pin connecting component is constructed as a mountable cap which can be placed by means of an internal toothing in a positively engaging manner in a plurality of positions on the threaded pin provided with a matching toothing.

The threaded pin acts in its locking position with a relatively high degree of force on the internal steering column jacket component. Therefore, when it is loosened the required turning moment is high for which reason high actuating forces are also necessary in the event of a mechanical actuation of the control cable. For this reason, the threaded pin is divided up radially into two sections between which a roller bearing which permits a rotation of the sections with respect to one another is located in the axial direction, and thus firstly the section operatively connected to the control cable in the roller bearing is loosened and the section resting against the internal steering column component can be raised by the loosened section in the axial direction.

An actuation switch acting as a pull actuation which has two fixed positions prevents an operator from unintentionally using the clamping device since the released and the locking position of the threaded pin can be predetermined by these fixed positions.

In the clamping device, a plurality of threaded pins can be provided in order, for example, to increase the clamping force. Here, the control cable can run in succession under tension to the threaded pins and be connected in each case to the latter in a tensile fashion, as a result of which the threaded pins can be rotated at the same time and to the same degree.

In order to retain the threaded pin securely in its locking position, it is advantageous to load it continuously by a moment in the locking direction, which can be realized by means of a tension spring which is connected to the threaded pin by means of a control cable. The control cable is at least partially wrapped around the pin connecting component and the tension spring is mounted on the outer steering column jacket component. When there is a single threaded pin, the tension spring can be directly attached to the end of the control cable opposite a pull actuation. If the clamping device should have a plurality of threaded pins, it is better to provide a pulling cable for the common loosening of the threaded pins and to connect in each case a separate pulling cable with an extra tension spring for their subjection to locking forces, which springs can apply approximately the same locking force on each threaded pin.

This clamping device can equally serve to eliminate the play of two steering column jacket components which require a certain play between the steering column jacket walls for their displacement and have a different locking device constructed in any desired way for fixing them. Here, the control cable which acts on the threaded pins can simultaneously also act on an actuation component of the locking device, as a result of which the locking and the elimination of the play of the steering column jacket components can be performed synchronously.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic, part sectional side view of a section of an axially adjustable steering column with a locking device and two threaded pins actuated with a control cable for eliminating play, constructed according to a preferred embodiment of the invention;

FIG. 2 is another side view of FIG. 1 with an additional actuation switch; and

DETAILED DESCRIPTION OF THE DRAWINGS

Figure 3:
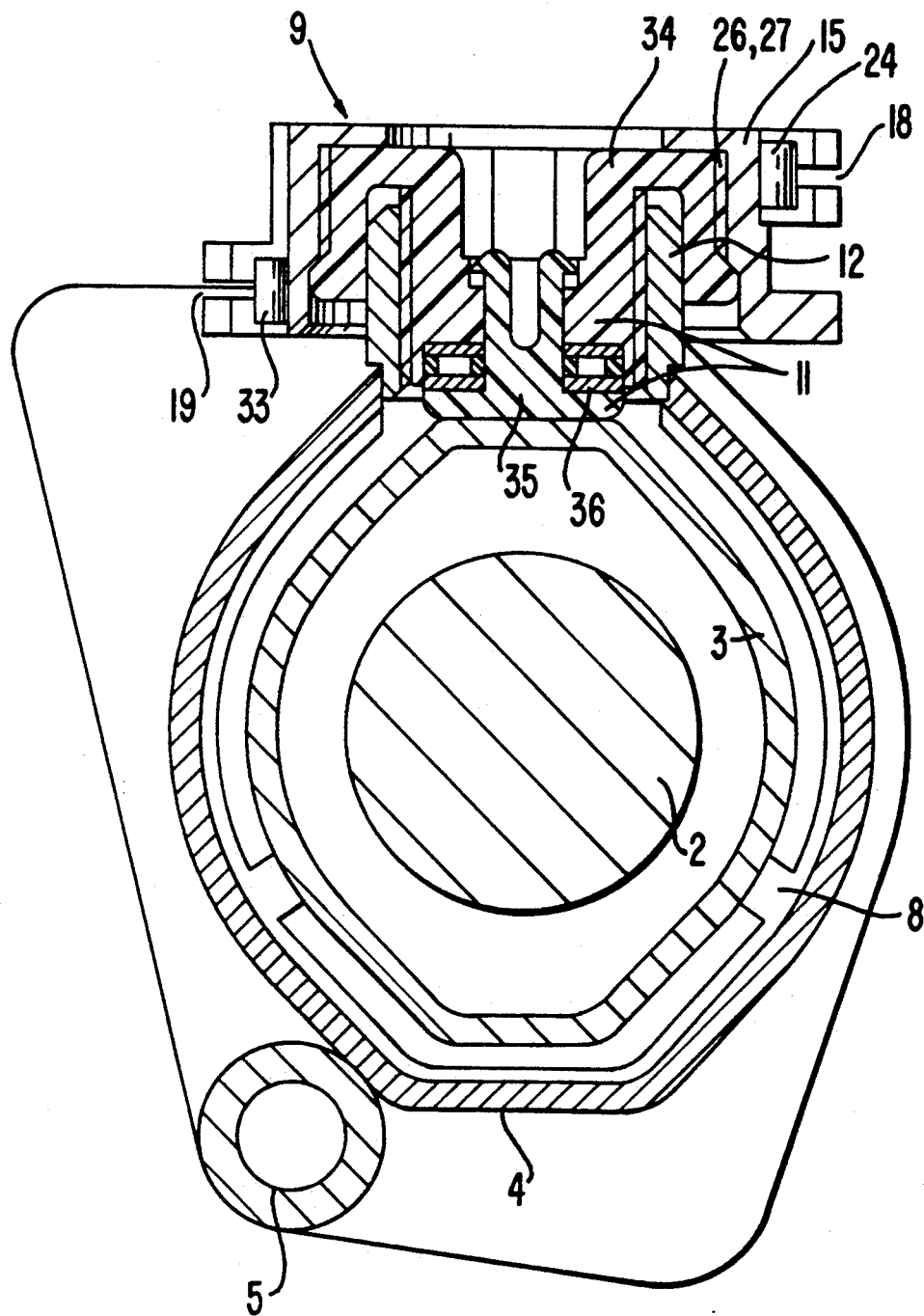
FIG. 3 shows a cross-sectional view along the line III—III in FIG. 1 of a further embodiment of a threaded pin.

In FIGS. 1 and 2 a section of an axially adjustable steering column 1 is illustrated which has an axially adjustable steering shaft 2 which is surrounded by two steering column jacket components 3 and 4 which during the axial displacement of the steering shaft 2 can be pulled together or apart in a telescopic fashion. In order to fix the position of the steering shaft 2 together with the position of the steering column jacket components 3, 4, a locking device 5 is provided which is formed here by an hydraulic piston-cylinder unit which is aligned parallel to the steering column jacket components 3, 4 and is attached with one end in each case to a steering column jacket component 3 and 4, respectively, and on which an actuation component 6 engages, by means of the effect of which the piston rod 7 can be retracted or extended.

The internal steering column jacket component 3 can be displaced in guides 8 of the outer steering column jacket component 4 which for this must have a smaller gap with respect to the internal steering column jacket component 3. Since, thus, even after its locking, the internal steering column jacket component 3 is not located completely immovably in the outer steering column jacket component 4, the steering column jacket components 3, 4 can be attached to one another by a clamp connection 9 which serves for eliminating the play of the two steering column jacket components 3, 4. The clamp connection 9 comprises two threaded pins 10, 11 which are mounted, in a radially movable fashion with respect to the longitudinal axis of the steering column jacket components 3, 4, in a threaded section 12 which is attached to the outer steering column jacket component 4 and penetrates the latter. During the screwing-in movement of the threaded pins 10, 11 they are displaced axially towards the inner steering column jacket component 3 and pressed onto it, as a result of which the steering column jacket components 3 and 4 are tensioned with respect to one another and rest statically against one another. After the threaded pins 10, 11 are turned back, the steering column jacket components 3, 4 can be displaced freely with respect to one another again after the locking device 5 is released.

In order to control the rotation of the threaded pins 10, 11 into the release position or the locking position and in order then to fix the threaded pins 10, 11 in one of these positions, a control cable 13 acts on the threaded pins 10, 11 and rotates them about their longitudinal axes. The cable 13 is connected to the pins 10, 11 via in each case one pin connecting component 14 and 15, respectively, attached to the threaded pins 10, 11, around which pins the control cable 13 is at least partially wound.

The pin connecting components 14, 15 each have two circular circumferential grooves 16, 17 and 18, 19, respectively, located axially one on top of the other. The control cable 13 is guided in circumferential grooves 16 and 18 located at a greater distance from the outer steering column jacket 4 on the pin connecting components 14, 15. The circular abutment face in the circumferential grooves 16, 17, 18, 19 leads to a uniform movement of the control cable 13. The diameter of the circumferential grooves 16, 17 and 18, 19 respectively influences, as a lever arm, the moment necessary for turning the threaded pins 10, 11. The control cable 13 is constructed at one end as a Bowden cable 20 the sheath of which is supported against an abutment 21 on the outer steering column jacket 4 and which is connected to a pull actuation 22. The pull actuation 22 has an actuation switch 23 which assumes two fixed and draws the control cable 13 with it during this movement.

As a result, the control cable 13 also assumes two positions with respect to the pins 10, 11. The control cable 13 is firstly guided in the circumferential groove 18 around the threaded component 15, located at a greater distance from the abutment 21, of the threaded pin 11 where it is coupled by means of a connecting bolt 24 and is then guided back to the other pin connecting component 14 where its end is also coupled to a connecting bolt 25 after a quarter circle wind about the upper circumferential groove 16. In the event of an actuation of the actuation switch 23 (in FIG. 2 a downward swivel) the control cable 13 pulled and thus turns the threaded pins 11 and 10 by means of the connecting bolts 24, 25 out of the illustrated locking position into a release position turned back by approximately 45 degrees, in which position the threaded pins 10, 11 are no longer seated on the inner steering column jacket component 3. So that the control cable 13 runs under tension from the abutment 21 to the two pin connecting components 14, 15 and can be positioned there at a right angle and is nevertheless simple to mount on the pin connecting components 14, 15, the pin connection components 14, 15 are constructed as a cap which can be placed in various turning positions on an outer toothing 27 of the threaded pins 10, 11 by means of a toothing 26 shown in FIG. 3. By means of an adjustment movement of the control cable 13, the threaded pins 10, 11 are adjusted at the same time and to the same degree.

In this steering column 1, the two threaded pins 10, 11 are arranged so as to tension the steering column jacket components 3, 4 with respect to one another with approximately the same force. Therefore, for each threaded pin 10, 11 a separate control cable 28 and 29, respectively, is provided. Cables 28, 29 are fixed by means of a pulling spring 30 and 31, respectively, on the outer steering column jacket component 4. Springs 30 and 31 are coupled by means of connecting bolts 32 and 33, respectively, to the pin connecting components 14 and 15 in such a way that each control cable 28 and 29, respectively, acts in the locking direction on its threaded pin 10 and 11. The control cable 28 is at least partially wound around the lower circumferential groove 17 of the pin connecting component 14 in every possible position and is connected to said pin connection component 14 by means of the connecting bolt 32. Likewise, the control cable 29 is attached to the pin connecting component 15 in the lower circumferential groove 19 by means of the connection bolt 33. These control cables 28 and 29 therefore attempt to move the threaded pins 10 and 11, respectively, into their locking position and are only impeded from doing this by the influence of the actuated control cable 13. In principle, the release and locking position of the threaded pins 10 and 11, respectively, could only be reached by a control cable system which was acted upon at both ends by a pulling force.

In this exemplary embodiment the control cable 13 is also used for actuating the locking device 5 whose actuating component 6 is attached to the control cable 13 as a result of which the locking and the elimination of the play of the steering column jacket components 3, 4 and the associated reversal movement are carried out synchronously.

The threaded pins 10, 11 act in their respective locking positions with a relatively high force on the internal steering column jacket component. Therefore, when they are loosened the required torque is also high, for which reason high actuation forces would also be necessary for a mechanical actuation of the control cable. In order to avoid this, the threaded pin 11, as illustrated in FIG. 3, can for example be divided radially into two sections 34, 35 between which a roller bearing 36 is located in the axial direction which permits rotation of the sections 34, 35 with respect to one another. Thus, during the loosening movement of the threaded pin 11 in the anticlockwise direction, the section 34 operatively connected to the control cable 13 is firstly loosened in the roller bearing 36 and the section 35 resting against the internal steering column jacket component 3 is subsequently raised in the axial direction by the loosened section 34.

What is claimed:

1. Axially adjustable steering column system for vehicles comprising:
   an axially displaceable steering shaft,
   an outer and an inner steering column jacket part surrounding the steering shaft, said steering column jacket parts being configured to be pushed together in a telescopic fashion with axial movement with respect to one another, and
   a clamp connection for selectively clampingly attaching the two steering column jacket parts to one another to hold them in their adjusted axial position,
   wherein the clamp connection includes at least one threaded pin which is radially movable with respect to a longitudinal axis of the steering column and is received on the outer steering column jacket part in a threaded section and after its screwing-in movement presses against the inner steering column jacket part, wherein a spring-loaded control cable is provided which acts in a rotating fashion on the threaded pin, and wherein the control cable surrounds a pin connecting part on the threaded pin resting against a circular cross-section at least over a distance of one arcuate section of the threaded pin.

2. Axially adjustable steering column according to claim 1, wherein the control cable is coupled on the pin connecting part, and wherein the threaded pin bears a cap as a pin connecting part, which cap can be attached via a toothing in a plurality of rotative positions on the threaded pin in a positively engaging manner.

3. Axially adjustable steering column according to claim 1, wherein the threaded pin is divided into two sections which rest against one another in the axial direction by means of a roller bearing.

4. Axially adjustable steering column according to claim 1, wherein a pull actuator which surrounds an actuation switch with two fixed positions is provided at one end of the control cable.

5. Axially adjustable steering column according to claim 1, wherein the control cable runs in succession under tension to a plurality of threaded pins and is connected in tensile fashion to said threaded pins.

6. Axially adjustable steering column according to claim 5, wherein further control cables with respective tension springs are provided for each threaded pin, which tension springs act on the threaded pins in the locking direction.

7. Axially adjustable steering column according to claim 1, wherein a locking device engages on the steering column jacket parts, and wherein the threaded pins tension the steering column jacket parts additionally with respect to one another during their locking in order to eliminate play.

8. Axially adjustable steering column according to claim 7, wherein an actuation part of the locking device is coupled to the control cable and can thus be actuated synchronously with the threaded pins.

9. Axially adjustable steering column according to claim 2, wherein the control cable runs in succession under tension to a plurality of threaded pins and is connected in tensile fashion to said threaded pins.

10. Axially adjustable steering column according to claim 9, wherein further control cables with respective tension springs are provided for each threaded pin, which tension springs act on the threaded pins in the locking direction.

11. Axially adjustable steering column according to claim 10, wherein a locking device engages on the steering column jacket parts, and wherein the threaded pins tension the steering column jacket parts additionally with respect to one another during their locking in order to eliminate play.

12. Axially adjustable steering column according to claim 11, wherein an actuation part of the locking device is coupled to the control cable and can thus be actuated synchronously with the threaded pins.

* * * * *